United States Patent
Hanazaki

(10) Patent No.: US 9,521,228 B2
(45) Date of Patent: Dec. 13, 2016

(54) MOBILE ELECTRONIC APPARATUS AND CONTROL METHOD OF MOBILE ELECTRONIC APPARATUS

(75) Inventor: Mitsuo Hanazaki, Yokohama (JP)

(73) Assignee: KYOCERA CORPORATION, Kyoto (JP)

(*) Notice: Subject to any disclaimer, the term of this patent is extended or adjusted under 35 U.S.C. 154(b) by 139 days.

(21) Appl. No.: 13/322,726

(22) PCT Filed: Jan. 27, 2011

(86) PCT No.: PCT/JP2011/051644
§ 371 (c)(1),
(2), (4) Date: Nov. 28, 2011

(87) PCT Pub. No.: WO2011/093397
PCT Pub. Date: Aug. 4, 2011

(65) Prior Publication Data
US 2012/0075180 A1    Mar. 29, 2012

(30) Foreign Application Priority Data
Jan. 27, 2010  (JP) .................. 2010-015350

(51) Int. Cl.
*G06F 3/00*     (2006.01)
*H04M 1/2745*   (2006.01)
*G06F 1/16*     (2006.01)

(52) U.S. Cl.
CPC ...... *H04M 1/274508* (2013.01); *G06F 1/1696* (2013.01); *G06F 3/002* (2013.01)

(58) Field of Classification Search
CPC  G06F 17/30011; G06F 17/241; G06F 1/1696; G06F 3/002; G06K 2209/01; G06K 9/00442; H04M 1/274508
(Continued)

(56) References Cited

U.S. PATENT DOCUMENTS 4,614,978 A * 9/1986 Doster et al. ................. 358/470
5,392,447 A * 2/1995 Schlack .............. G06F 15/0225
                                                     379/355.03
(Continued)

FOREIGN PATENT DOCUMENTS

JP    2003-036260 A    2/2003
JP    2008-236809 A    10/2008
(Continued)

OTHER PUBLICATIONS

International Search Report for PCT/JP2011/051644 mailed Apr. 26, 2011.
(Continued)

*Primary Examiner* — Jose Soto Lopez
(74) *Attorney, Agent, or Firm* — Hauptman Ham, LLP

(57) ABSTRACT

Provided herein is a mobile electronic apparatus or a control method of the mobile electronic apparatus, the mobile electronic apparatus including an operating unit for performing a character input operation, an acquiring unit that acquires a photographed image of a subject, an analyzing unit that analyzes the photographed image acquired by the acquiring unit and extracts character information contained in the photographed image, and a control unit that detects an input operation as a character input operation when the input operation is performed with the operating unit while the photographed image is being analyzed by the analyzing unit. Accordingly, detecting an input operation in the operating unit as entering characters even during an analysis in the analyzing unit makes it possible to use time efficiently.

17 Claims, 12 Drawing Sheets

(58) Field of Classification Search
USPC .......................................................... 345/156
See application file for complete search history.

(56) References Cited

U.S. PATENT DOCUMENTS

| | | | |
|---|---|---|---|
| 2003/0086615 A1* | 5/2003 | Dance et al. ................. | 382/200 |
| 2004/0056883 A1* | 3/2004 | Wierowski ............ | G06F 3/0482 |
| | | | 715/719 |
| 2005/0007455 A1* | 1/2005 | Yamazaki et al. ....... | 348/207.99 |
| 2005/0037806 A1* | 2/2005 | Na ....................... | H04M 1/2755 |
| | | | 455/556.1 |
| 2005/0052558 A1* | 3/2005 | Yamazaki .............. | G06K 9/228 |
| | | | 348/333.12 |
| 2006/0146028 A1* | 7/2006 | Chang .................... | G06F 3/018 |
| | | | 345/169 |
| 2009/0136135 A1* | 5/2009 | Eom ................... | G06K 9/2081 |
| | | | 382/181 |
| 2009/0231282 A1* | 9/2009 | Fyke ............................ | 345/169 |
| 2010/0134824 A1* | 6/2010 | Ferlitsch ............ | H04N 1/00408 |
| | | | 358/1.15 |
| 2010/0295791 A1 | 11/2010 | Nishimura et al. | |

FOREIGN PATENT DOCUMENTS

| | | |
|---|---|---|
| JP | 2009-159379 A | 7/2009 |
| JP | 2009176118 A | 8/2009 |
| JP | 2009-224919 A | 10/2009 |

OTHER PUBLICATIONS

Office Action mailed Aug. 20, 2013 corresponds to Japanese patent application No. 2011-231008.

* cited by examiner

MOBILE ELECTRONIC APPARATUS AND CONTROL METHOD OF MOBILE ELECTRONIC APPARATUS

RELATED APPLICATIONS

The present application is a National Phase of International Application Number PCT/JP2011/051644, filed Jan. 27, 2011 and claims priority from, Japanese Application Number 2010-015350, filed Jan. 27, 2010.

TECHNICAL FIELD

The present invention relates to a mobile electronic apparatus that extracts character information from an image read out and a control method of the mobile electronic apparatus.

BACKGROUND ART

In recent years, a technology to read out character information from an image has been developed. For example, Patent Literature 1 discloses an apparatus that takes in a business card as an image, extracts character information therefrom, and manages the extracted information. Furthermore, a function to read out character information from an image may be provided to a mobile electronic apparatus that includes a camera function.

CITATION LIST

Patent Literature

Patent Literature 1: Japanese Patent Application Laid-open No. 2003-036260

DISCLOSURE OF INVENTION

Problem to be Solved by the Invention

When reading out character information from an image, it takes time to analyze the image. Furthermore, in a mobile electronic apparatus, because other processes cannot be performed while the image is being analyzed, it is necessary to wait for the analysis to be finished. Therefore, speedy processing has limitations.

In view of the above, the present invention is aimed to provide a mobile electronic apparatus that makes it possible to use time efficiently and a control method of the mobile electronic apparatus.

SUMMARY OF THE INVENTION

According to an aspect, a mobile electronic apparatus according to the present invention includes: an operating unit for performing a character input operation; an acquiring unit that acquires a photographed image of a subject; an analyzing unit that analyzes the photographed image acquired by the acquiring unit and extracts character information contained in the photographed image; and a control unit. When an input operation is performed with the operating unit while the photographed image is being analyzed by the analyzing unit, the control unit detects the input operation as a character input operation.

According to another aspect, the mobile electronic apparatus further includes a storage unit. The control unit makes the storage unit store therein characters entered by the character input operation in association with character information extracted by the analyzing unit.

According to another aspect, the characters include numeric characters and non-numeric characters, the operating unit includes a key assigned with a numeric character and a non-numeric character, the storage unit stores therein character information extracted by the analyzing unit in such a manner that the character information are separated into a plurality of items, and the control unit maps, according to the characters entered by the character input operation, the characters to any of the plurality of items.

According to another aspect, the control unit maps, according to number of digits of the numeric characters entered by the character input operation, the characters to any of the plurality of items.

According to another aspect, the control unit stores therein characters entered by the character input operation when an analyzing process by the analyzing unit is determined failed, and detects the stored characters as the characters entered by the character input operation during a subsequent analyzing process.

According to another aspect, the mobile electronic apparatus further includes a display unit. The control unit makes the display unit display characters corresponding to the character input operation when detecting the character input operation.

According to another aspect, the characters include numeric characters and non-numeric characters, the operating unit includes a key assigned with a numeric character and a non-numeric character, and the control unit makes the display unit display both numeric characters and non-numeric characters as input characters corresponding to the character input operation.

According to another aspect, the control unit divides a display area of the display unit into two display areas and makes the display unit display characters entered as the non-numeric characters on one of the display areas and display numeric characters entered as numeric characters on the other one of the display areas when detecting the character input operation.

According to another aspect, the non-numeric characters include alphabets.

According to another aspect, the control unit informs a completion of an analyzing process performed by the analyzing unit when the analyzing process is completed while characters are being entered.

According to another aspect, the subject is a business card.

According to another aspect, a control method is a control method of a mobile electronic apparatus comprising an operating unit for performing a character input operation, an acquiring unit that acquires a photographed image of a subject, and an analyzing unit that analyzes the photographed image acquired by the acquiring unit to extract character information. The control method includes: acquiring a photographed image of a subject by the photographing unit; analyzing the photographed image to extract character information contained in the photographed image by the analyzing unit; and detecting, when an input operation is performed with the operating unit while the photographed image is being analyzed by the analyzing unit, the input operation as a character input operation.

Effect of the Invention

The mobile electronic apparatus and the control method of the mobile electronic apparatus according to the invention have an effect of making it possible to use time efficiently.

DESCRIPTION OF EMBODIMENTS

The present invention will be described in detail hereinafter with reference to the accompanying drawings. However, the invention is not restricted by the following explanation. The constituent elements in the following description include those that can be easily assumed by a person of an ordinary skill in the art, those that are substantially the same, and those of so-called equivalents. In the followings, although a mobile phone is exemplified as a mobile electronic apparatus, the subject to which the invention is applied is not limited to the mobile phone, and the invention is applicable, for example, to a personal handy-phone system (PHS), a PDA, a mobile navigation device, a game device, and the like.

Figure 1:
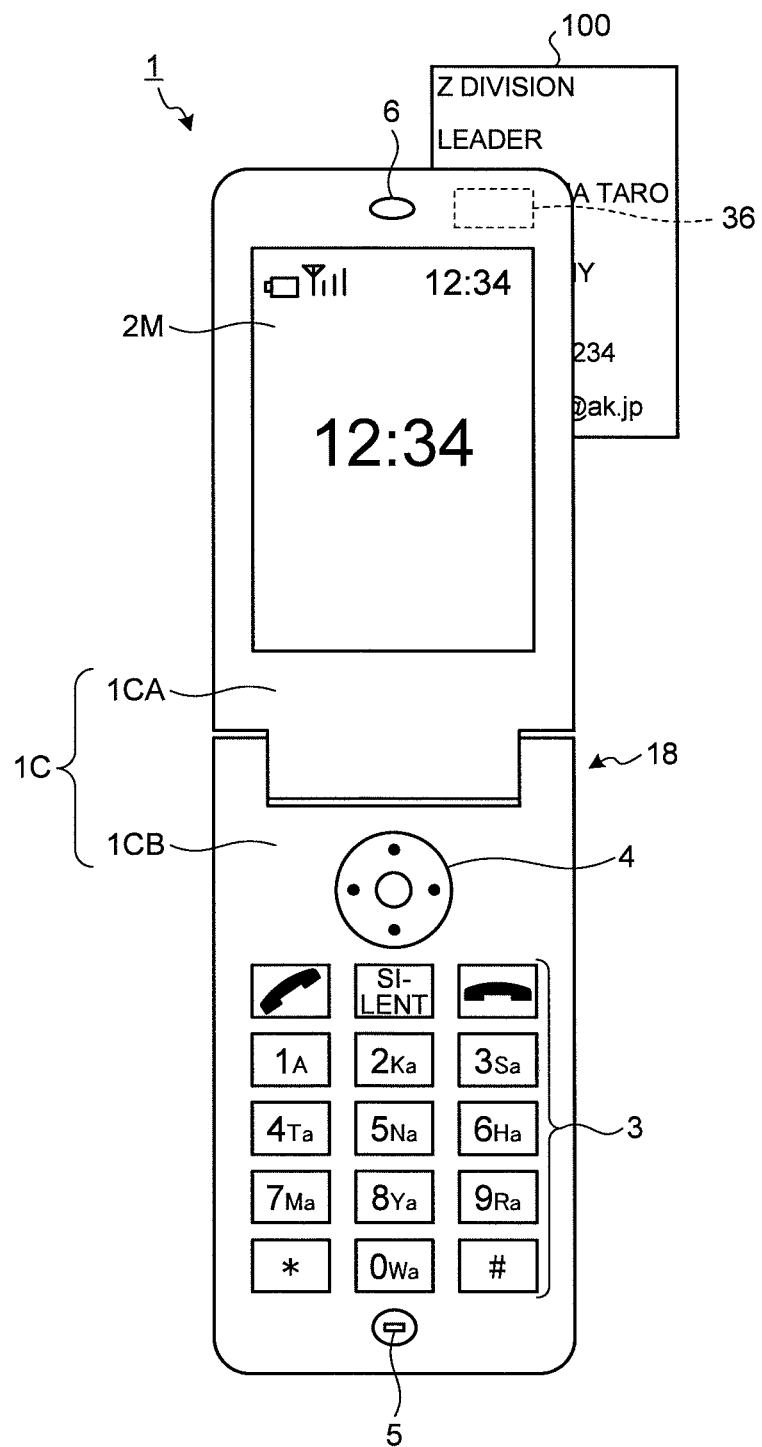
FIG. 1 is a front elevation view schematically illustrating a configuration of a mobile electronic apparatus according to an embodiment of the invention.

FIG. 1 is a front elevation view schematically illustrating a configuration of a mobile electronic apparatus according to an embodiment of the invention. A mobile electronic apparatus 1 is a mobile phone provided with a wireless communication function. The mobile electronic apparatus 1 is a flip type mobile phone in which a case 1C is configured with a first case 1CA and a second case 1CB allowing it to be opened and closed. FIG. 1 depicts the mobile electronic apparatus 1 in an opened state. Furthermore, FIG. 1 depicts it in a state in which a business card 100 is placed in a photographing area of a camera 36 (described later) of the mobile electronic apparatus 1. The business card 100 is a piece of paper described with personal information such as a name, Japanese syllables thereof, a telephone number, a mail address, an address, a company name, a section name, a job title, and the like of a specific person.

The first case 1CA includes a main display 2M depicted in FIG. 1 as a display unit. The main display 2M displays, as given images, a standby image while the mobile electronic apparatus 1 is in a state of standing by for reception or a menu image used for assisting an operation of the mobile electronic apparatus 1. As illustrated in FIG. 1, the first case 1CA further includes a receiver 6 that produces sound during a call of the mobile electronic apparatus 1. The first case 1CA further includes the camera 36, and a photographing window is provided on the opposite surface to the surface where the main display 2M is provided.

The second case 1CB includes a plurality of operation keys 3 for entering a telephone number of an intended party and characters when creating e-mail and such, and cursor and center keys 4 for easily executing selection and decision of menu, scroll of screen, and the like displayed on the main display 2M. The operation keys 3 and the cursor and center keys 4 constitute an operating unit 28 (see FIG. 2) of the mobile electronic apparatus 1. The second case 1CB further includes a microphone 5 that receives sound during a call of the mobile electronic apparatus 1.

The first case 1CA and the second case 1CB are coupled by a hinge 18. This allows both the first case 1CA and the second case 1CB to be turned centered around the hinge 18 and to be turned in a direction to be away from each other and in a direction to be close to each other. When the first case 1CA and the second case 1CB are turned in the direction to be away from each other, the mobile electronic apparatus 1 is opened, and when the first case 1CA and the second case 1CB are turned in the direction to be closer to each other, the mobile electronic apparatus 1 is closed.

Figure 2:
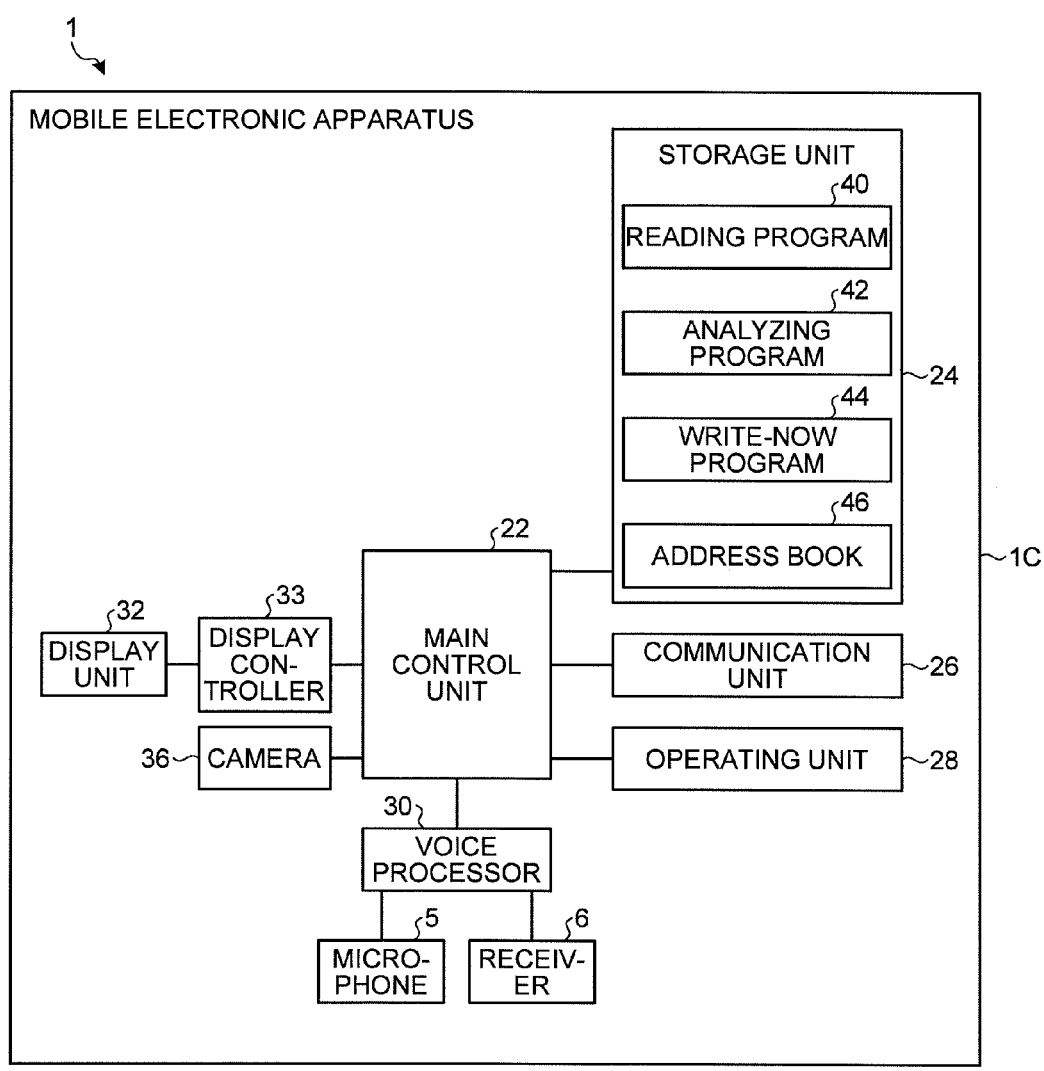
FIG. 2 is a block diagram schematically illustrating a functional configuration of the mobile electronic apparatus depicted in FIG. 1.

A relationship between functions of the mobile electronic apparatus 1 and a control unit will be described. FIG. 2 is a block diagram schematically illustrating a functional configuration of the mobile electronic apparatus depicted in FIG. 1. As illustrated in FIG. 2, the mobile electronic apparatus 1 includes a main control unit 22, a storage unit 24, a communication unit 26, the operating unit 28, a voice processor 30, a display unit 32, a display controller 33, and the camera 36.

The main control unit 22 is a processing unit, for example, a central processing unit (CPU), that integrally controls an overall operation performed by the mobile electronic apparatus 1. More specifically, the main control unit 22 controls operations performed by the communication unit 26, the display unit 32, and such so that various processes of the mobile electronic apparatus 1 are executed in appropriate procedures corresponding to operations on the operating unit 28 and software stored in the storage unit 24 of the mobile electronic apparatus 1. The main control unit 22 executes processes based on programs (for example, an operating system program, application programs, and such) stored in the storage unit 24.

The storage unit 24 stores therein software and data used for processes in the main control unit 22. Specifically, the storage unit 24 stores therein a reading program 40, an analyzing program 42, and a write-now program 44. The storage unit 24 further stores therein a program to execute sending and receiving e-mail. The storage unit 24 further stores therein various types of data other than programs. For example, the storage unit 24 stores therein an address book 46 storing names, telephone numbers, mail addresses, and such, dictionary data used for character conversions, image data photographed by the camera (acquiring unit) 36, and the like.

The reading program 40 is a software program that executes a process of driving the camera 36 and acquiring an image of a subject to read (photographed image). The analyzing program 42 is a software program that executes a process of analyzing an image, more specifically, executes a process of analyzing an image and extracting characters contained in the image. The write-now program 44 is a software program that executes a character input process based on the operation to the operating unit 28. The software implemented by processing the write-now program 44 detects a character input operation when a character key of the operating unit 28 is pressed down even in a state where a character input screen is not activated.

The communication unit 26 establishes a wireless signal path with a base station by a CDMA system and such through a channel assigned by the base station and carries out telephone communication and information communication with the base station.

The operating unit 28 is configured with the operation keys 3 to which various functions are assigned, for example, a power key, a call key, numeral keys, character keys, direction keys, a decision key, and a send key, and with the cursor and center keys 4. When these keys are entered by an operation of a user, the operating unit 28 generates signals corresponding to the respective content of the operations. The generated signals are then fed to the main control unit 22 as instructions of the user.

The voice processor 30 executes a process of audio signals received to the microphone 5 and audio signals output from the receiver 6.

The display unit 32 includes display panels (above-described main display 2M and such) configured with a liquid crystal display (LCD), an organic electro-luminescence (EL) panel, and such, and displays on the display panels videos corresponding to video data and images corresponding to image data supplied from the main control unit 22 via the display controller 33.

The camera 36 is provided, as described above, on the surface opposite to that of the main display 2M of the first case 1CA, and is an imaging system that acquires an image of a photographing area (an area included in a view angle of a constant angle) facing the opposite surface. The camera 36 sends a photographed image to the main control unit 22.

Figure 3:
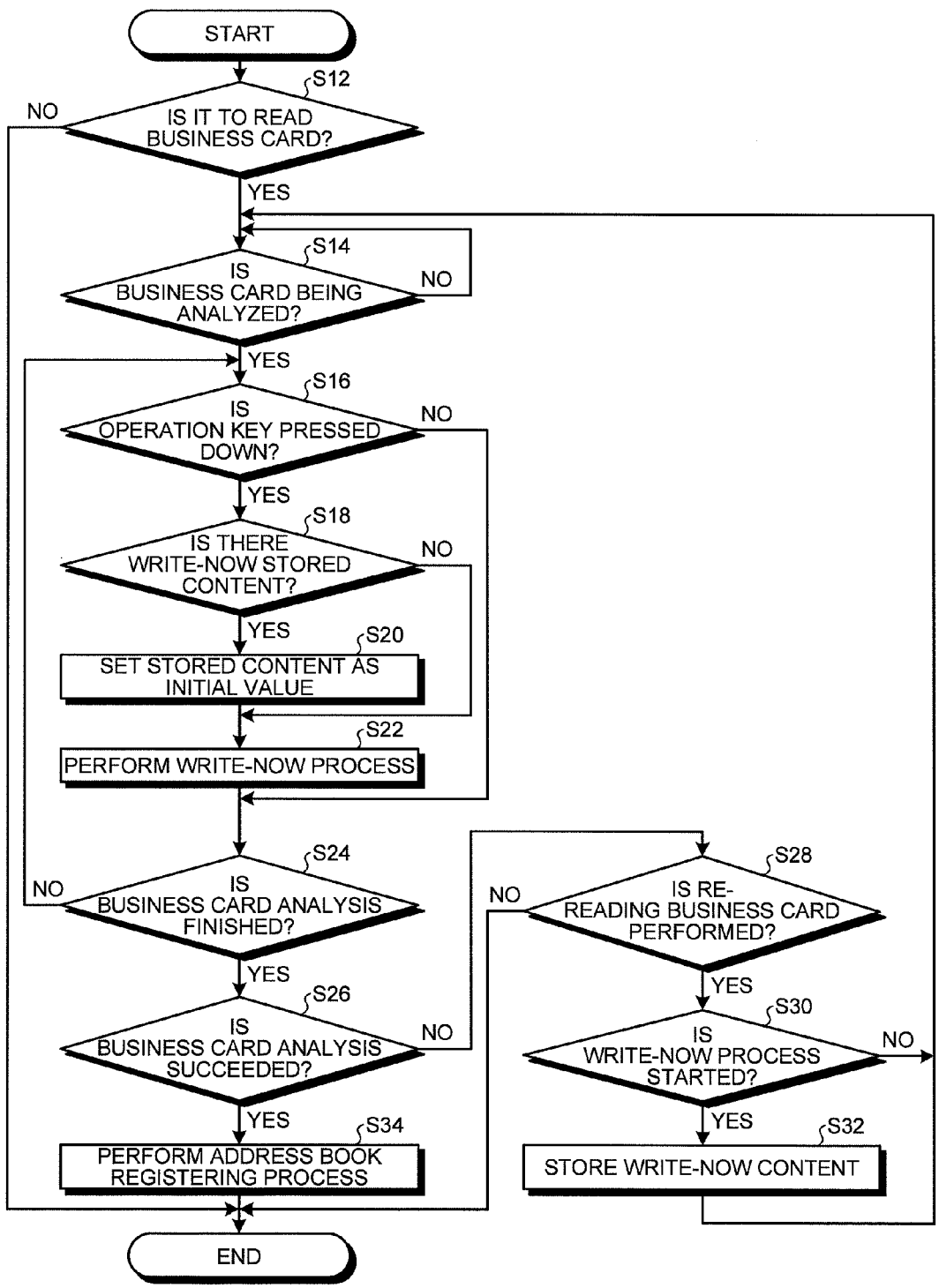
FIG. 3 is a flowchart illustrating an example of processing operation performed by the mobile electronic apparatus.

Operations performed by the mobile electronic apparatus 1, more specifically, processes performed in the main control unit 22 will be described. FIG. 3 is a flowchart illustrating an example of processing operation performed by the mobile electronic apparatus. The flowchart illustrated in FIG. 3 is a flowchart illustrating processing operations of photographing the business card 100 by the camera 36, reading characters described on the business card 100, and storing the character information read out in the address book 46. The main control unit 22 reads out the reading program 40, the analyzing program 42, and the write-now program 44 to implement the software for carrying out above processes. The mobile electronic apparatus 1 may make the storage unit 24 store therein a software program for a business card registering process that carries out an overall process in addition to those programs and make the main control unit 22 execute it to carry out an overall process. Alternatively, these may be configured to be executed by single software.

The main control unit 22 of the mobile electronic apparatus 1 reads out various programs from the storage unit 24, based on the user operation entered to the operating unit 28 or various settings, to start up the software. When an image is read (photographed) by the camera 36 based on the user operation, the main control unit 22 determines, at Step S12, whether it is to read business card. In other words, the main control unit 22 determines whether the image photographed by the camera 36 is a business card. The condition for the main control unit 22 to determine whether a photographed image is a business card is not specifically limited. For example, it may be determined whether instructions to read a business card is received at the time the camera is started up, or it may be determined to be a business card from a layout and such by pre-analyzing an image read out.

When it is not to read a business card (No) at Step S12, the main control unit 22 ends the process. Additionally, a process may be carried out by other application software that processes photographed images.

When it is to read a business card (Yes) at Step S12, the main control unit 22 determines, at Step S14, whether the business card is being analyzed. In other words, it is determined whether an analyzing process of a business card (process of extracting character information described in an acquired image of a business card) is started. The analyzing process of a business card may be configured to be started automatically or to be started by the user operation.

When the business card is not being analyzed (No), i.e., the analyzing process is not started at Step S14, the main control unit 22 proceeds to Step S14. In other words, the main control unit 22 repeats the process at Step S14 until the process of analyzing a business card is started.

When the business card is being analyzed (Yes) at Step S14, the main control unit 22 determines, at Step S16, whether any of the operation keys 3 are pressed down, more specifically, whether a character input operation is occurred to the operation keys 3. Although subjects of the operation keys 3 determined to be pressed down at Step S16 can be all of the operation keys 3, it is preferable to be the keys with characters and numerals assigned. When any of the operation keys 3 is not pressed down (No) at Step S16, the main control unit 22 proceeds to Step S24.

When any of the operation keys 3 is pressed down (Yes) at Step S16, the main control unit 22 determines that a character input operation is performed and starts a process based on the write-now program 44, and determines, at Step S18, whether there is any write-now stored content present. The write-now stored content is a string of characters to be displayed as a string of characters entered (initial value) when a write-now process is started.

When there is any write-now stored content present (Yes) at Step S18, the main control unit 22 sets, at Step S20, the stored content as an initial value. More specifically, the main control unit 22 sets the stored string of characters as an entered string of characters. The main control unit 22 then proceeds to Step S22.

When there is no write-now stored content present (No) at Step S18 or when the process at Step S20 is finished, the main control unit 22 carries out, at Step S22, a write-now process. The write-now process is a process of entering a string of characters based on the user operation. The write-now process will be described later.

When the write-now process is performed at Step S22, the main control unit 22 determines, at Step S24, whether the business card analysis is finished. When the business card analysis is not finished (No), i.e., the business card is being analyzed at Step S24, the main control unit 22 proceeds to Step S16 and repeats the above-described processes.

When the business card analysis is finished (Yes) at Step S24, the main control unit 22 determines, at Step S26, whether the business card analysis is succeeded. More specifically, the main control unit 22 determines whether character information is acquired by the image analysis. The determination of whether a business card analysis is succeeded can be optionally set, and it may be determined succeeded when at least one of character information is acquired or when character information of a certain number of items or more required for registering in the address book 46 is acquired.

When the business card analysis is not succeeded (No) at Step S26, the main control unit 22 determines, at Step S28, whether re-reading the business card is performed. More specifically, the main control unit 22 determines whether an image of the business card is acquired again using the camera 36. When the re-reading the business card is not performed (No), i.e., an image of the business card is not newly acquired at Step S28, the main control unit 22 ends the process.

When re-reading the business card is performed (Yes), i.e., an image of the business card is newly photographed and acquired at Step S28, the main control unit 22 determines, at Step S30, whether a write-now process is started. In other words, the main control unit 22 determines whether the processes from Step S18 to Step S22 are performed. When a write-now process is not started (No) at Step S30, the main control unit 22 proceeds directly to Step S14. When a write-now process is started (Yes) at Step S30, the main control unit 22 stores write-now content at Step S32. More specifically, the main control unit 22 stores character information entered at Step S22 as the write-now content. The main control unit 22 then proceeds to Step S14.

When the business card analysis is succeeded (Yes) at Step S26, the main control unit 22 carries out, at Step S34, an address book registering process. The address book registering process is a process to register information acquired in a business card analysis and information entered in a write-now process as information for the address book 46. The address book registering process will be explained later. When the address book registering process is performed at Step S34, the main control unit 22 ends the process.

In this manner, the mobile electronic apparatus 1 starts a write-now process (character input process), and thus allows to enter characters when a character input operation is detected even while an image is being analyzed. Accordingly, even during the analysis of an image, the user can perform operations other than just waiting for the process, and thus can use time efficiently. Specifically, as in the present embodiment, when entering a character assigned to one of the operation keys 3 (telephone keypad), the one of the operation keys 3 may need to be pressed down more than once to input a single character and thus it may take time. However, being able to input during the analysis of an image makes it possible to use time efficiently.

Figure 4:
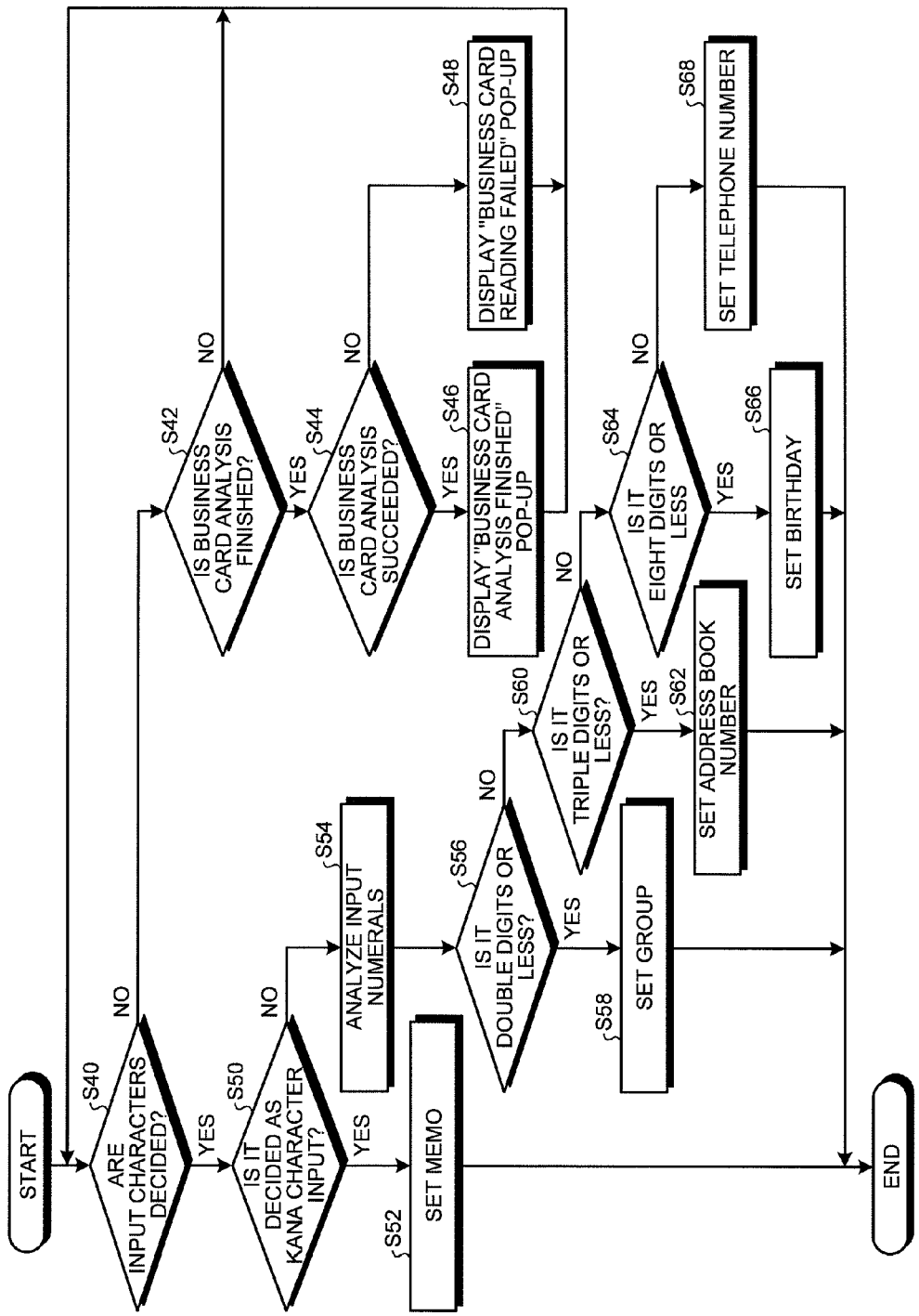
FIG. 4 is a flowchart illustrating an example of processing operation performed by the mobile electronic apparatus.

With reference to FIG. 4, an example of a write-now process performed at Step S22 above will be explained. FIG. 4 is a flowchart illustrating an example of processing operation performed by the mobile electronic apparatus. When a write-now process is started, the main control unit 22 first determines, at Step S40, whether input characters are decided. More specifically, it is determined whether a character input operation by the user is finished. The determination of whether input characters are decided can be made by determining whether a deciding process by the user is received. Furthermore, the main control unit 22 detects an operation entered to the operating unit 28 in a write-now process in two modes where it is entered as Japanese syllable (kana) characters (kana character input mode) and where it is entered as numeric characters (numeric character input mode). Consequently, the main control unit 22 detects two types of character information (a kana character string and a numeric character string) as input characters.

When the input characters are not decided (No) at Step S40, the main control unit 22 determines, at Step S42, whether the business card analysis is finished. The main control unit 22 can carry out the same process as that of Step S24 to determine whether a business card analysis is finished. However, the process at Step S42 and the process at Step S24 are separate processes. When the business card analysis is not finished (No) at Step S42, the main control unit 22 proceeds to Step S40 and then determines again whether input characters are decided.

When the business card analysis is finished (Yes) at Step S42, the main control unit 22 determines, at Step S44, whether the business card analysis is succeeded. The main control unit 22 can carry out the same process as that of Step S26 to determine whether the business card analysis is succeeded. However, the process at Step S44 and the process at Step S26 are separate processes.

When the business card analysis is succeeded (Yes) at Step S44, the main control unit 22 carries out, at Step S46, a pop-up display of "Business card analysis finished." More specifically, the main control unit 22 makes the display unit 32 display a string of characters of "Business card analysis finished." The main control unit 22 then proceeds to Step S40. Meanwhile, when the business card analysis is not succeeded (No), i.e., the business card analysis is determined failed at Step S44, the main control unit 22 carries out, at Step S48, a pop-up display of "Business card reading failed." More specifically, the main control unit 22 makes the display unit 32 display a string of characters of "Business card reading failed." The main control unit 22 then proceeds to Step S40. Consequently, the main control unit 22 repeats the processes performed from Step S40 to Step S48 until input characters are decided. The main control unit 22 may, after the process at Step S46 or at Step S48 is carried out once, repeat only the process at Step S40 until input characters are decided. Furthermore, the main control unit 22 detects operations of the operation keys 3 entered during the processes performed from Step S40 to Step S48 as a character input operation.

When the input characters are decided (Yes) at Step S40, the main control unit 22 then determines, at Step S50, whether it is decided as kana character input. More specifically, the main control unit 22 determines whether the input characters are decided as kana characters. The determination of whether to decide as kana characters can be determined based on an operation entered to the operating unit 28.

When it is decided as kana character input (Yes) at Step S50, the main control unit 22 sets up a memo, more specifically, sets an item to store the input characters entered in the write-now process as a memo item (an item in the address book 46) at Step S52, and then ends the process.

When it is not decided as kana character input (No) at Step S50, the main control unit 22 analyzes a numerical value entered at Step S54. In other words, the main control unit 22 determines that an input character string is entered as a numerical value (numerals) so as to analyze the input characters.

When the numeric character input is analyzed at Step S54, the main control unit 22 determines, at Step S56, whether it is of double digits or less. More specifically, the main control unit 22 determines whether the input characters are a numerical value of double digits or less. When the input characters are of double digits or less (Yes), the main control unit 22 sets up a group, more specifically, sets an item to store the input characters entered in the write-now process as a group item at Step S58, and then ends the process. The address book 46 stores therein groups of registrants in the address book 46 sorted by two-digit numbers.

When the input characters are not of double digits or less (No) at Step S56, the main control unit 22 determines, at Step S60, whether it is of triple digits or less. More specifically, the main control unit 22 determines whether the input characters are a numerical value of triple digits or less. When the input characters are of triple digits or less (Yes) at Step S60, the main control unit 22 sets up an address book number, more specifically, sets an item to store the input characters entered in the write-now process as an address book number at Step S62, and ends the process. The address book 46 stores therein registry numbers of registrants in the address book 46 by three-digit numbers.

When the input characters are not of triple digits or less (No) at Step S60, the main control unit 22 determines, at Step S64, whether it is of eight digits or less. More specifically, the main control unit 22 determines whether the input characters are of a numerical value of eight digits or less. When the input characters are of eight digits or less (Yes) at Step S64, the main control unit 22 sets up a birthday, more specifically, sets an item to store the input characters entered in the write-now process as a birthday item at Step S66, and ends the process. When the input characters are not of eight digits or less (No) at Step S64, the main control unit 22 sets up a telephone number, more specifically, sets an item to store the input characters entered in the write-now process as a telephone number item at Step S68, and ends the process.

The mobile electronic apparatus 1 classifies input characters as described in the foregoing, whereby an operation to select an item to register the input characters entered in a write-now process can be omitted, thereby enhancing an operability. As in the above-described embodiment, to select an item based on the number of digits of a numerical value entered makes it possible to easily perform an item selection. Furthermore, analyzing business card makes it possible to easily distinguish whether it is of any of a telephone number, a postal code, an address, or the like that are items to be entered in the address book. Although it is preferable that the mobile electronic apparatus 1 select items based on the number of digits of a numerical number because the process becomes simple, it is not limited as such. The mobile electronic apparatus 1 may select items in response to input characters. Such an automatic selection of the items in response to the input characters makes it possible to omit an operation of selecting an item to register the input characters, thereby allowing the operability to be enhanced.

As in the present embodiment, the mobile electronic apparatus 1 displays characters both in kana character input mode and in numeric character input mode at the same time, and thus allows the user to view an input result in a plurality of modes without switching the input modes. Furthermore, as described above, mobile electronic apparatus 1 selects an input mode automatically based on the input characters (number of digits of input characters), and thus allows the input mode to be decided without entering an operation by the user. Accordingly, this allows the user to save the trouble of operation. The user can select any of the input modes by selecting an input mode from the input result displayed in two modes.

The mobile electronic apparatus 1 further notifies the user of a completion of analysis (analysis succeeded or analysis failed) when the analysis is finished, thereby making the user recognize the completion of the analysis and thus prompting the user to quickly shift to a subsequent operation.

The mobile electronic apparatus 1 according to the present embodiment has been exemplified to classify input characters because the operation can be made simpler, however, it is not limited to this. For example, the mobile electronic apparatus 1 may be configured to select an item by the user operation after input characters are entered. Alternatively, the mobile electronic apparatus 1 may be configured to constantly register input characters to a memo item.

The mobile electronic apparatus 1 according to the present embodiment may be configured to repeat the above-described processes a number of times, more specifically, to enter characters by write-now process a number of times to enter characters to a plurality of items. Consequently, a waiting time during an analysis can be used more efficiently.

The mobile electronic apparatus 1 according to the present embodiment performs a process to start up a character input screen, i.e., a write-now process by pressing down the operation keys 3 because the operation can be made simpler, however, it is not restricted to this. The mobile electronic apparatus 1 may be configured to start up a character input screen by a menu select operation by the user.

Figure 5:
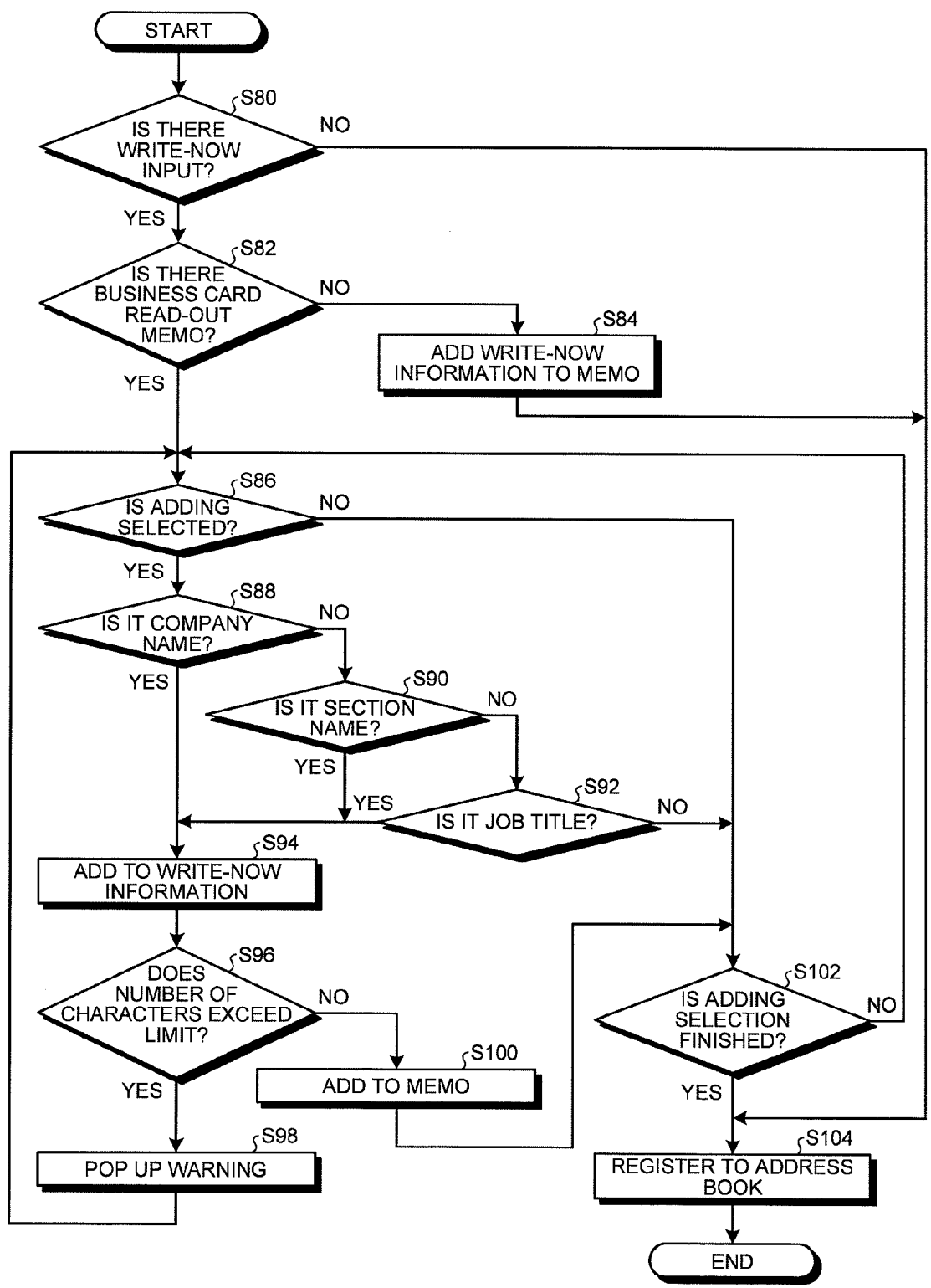
FIG. 5 is a flowchart illustrating an example of processing operation performed by the mobile electronic apparatus.

With reference to FIG. 5, an example of an address book registering process performed at Step S34 above will be explained. FIG. 5 is a flowchart illustrating an example of processing operation performed by the mobile electronic apparatus. First, as an address book registering process, the main control unit 22 classifies character information detected in a business card analysis by item. The items here are items assumed to be described on a business card such as a name, Japanese syllables thereof, a telephone number, a mail address, an address, a company name, a section name, and a job title. The main control unit 22 makes the display unit 32 display the classified items and their content as a list. The main control unit 22 further maps the character information of the items that correspond to the items of the address book 46 out of the classified items to the respective items of the address book 46.

The main control unit 22 then determines, at Step S80, whether there is any write-now input present. More specifically, the main control unit 22 determines whether the process at Step S22 above (the process indicated in FIG. 4) is carried out and the input characters are mapped to a memo, more specifically, whether there are any input characters to be entered as a memo. When there is no write-now input present (No) at Step S80, the main control unit 22 proceeds to Step S104. The main control unit 22 can be set up to carry out a later described process of adding a business card read-out memo even when there is no write-now input present.

When there is a write-now input present (Yes) at Step S80, the main control unit 22 determines, at Step S82, whether there is a business card read-out memo. The business card read-out memo here means information of items that cannot be mapped to the address book 46 out of the items acquired in a business card analysis. In the present embodiment, the character information classified as the respective items of company name, section name, and job title correspond to the business card read-out memo. When there is no business card read-out memo (No) at Step S82, the main control unit 22 adds write-now information to a memo at Step S84, and then proceeds to Step S104.

When there is a business card read-out memo (Yes) at step 82, the main control unit 22 then determines, at Step S86, whether adding is selected. More specifically, the main control unit 22 determines whether an item to add is selected by the user operation. When an adding item is not selected (No) at Step S86, the main control unit 22 proceeds to Step S102.

When adding is selected (Yes), i.e., an adding item is selected at Step S86, the main control unit 22 starts a process of extracting information of a business card read-out memo to be added to a memo item of the address book 46. The main control unit 22 first determines, at Step S88, whether an adding item is a company name item. When the adding item is a company name item (Yes) at Step S88, the main control unit 22 proceeds to Step S94. When the adding item is not a company name item (No) at Step S88, the main control unit 22 determines, at Step S92, whether the adding item is a section name item. When the adding item is a section name item (Yes) at Step S90, the main control unit 22 proceeds to Step S94. When the adding item is not a section name item (No) at Step S90, the main control unit 22 determines, at Step S92, whether the adding item is a job title item. When the adding item is a job title item (Yes) at Step S92, the main control unit 22 proceeds to Step S94. When the adding item is not a job title item (No) at Step S92, the main control unit 22 proceeds to Step S102.

When Yes is determined at Step S88, Step S90, or Step S92, the main control unit 22 adds the character information of the item selected as an adding item to the write-now information at Step S94. More correctly, the character information is added to the character information that is set to be entered to a memo item.

When the character information is added at Step S94, the main control unit 22 determines, at Step S96, whether the number of characters exceeds a limit. More specifically, the main control unit 22 determines whether the number of characters of the character information created at Step S94 exceeds a number of characters limit. When the number of characters exceeds the limit (Yes), i.e., the number of characters exceeds the number of characters limit at Step S96, the main control unit 22 displays, at Step S98, a warning pop-up. More specifically, the main control unit 22 makes the display unit 32 display the information indicating that the number of characters exceeds the limit. Thereafter, the main control unit 22 proceeds to Step S86.

When the number of characters does not exceed the limit (No), i.e., the number of characters is within the limit at Step S96, the main control unit 22 adds a memo at Step S100. More specifically, the main control unit 22 registers the character information created at Step S94 to a memo item. Thereafter, the main control unit 22 proceeds to Step S102.

When the process at Step S100 is completed, or when No is determined at Step S86 or Step S92, the main control unit 22 determines at Step S102, whether the adding selection is finished. When the adding selection is not finished (No) at Step S102, the main control unit 22 proceeds to Step S86 and repeats the above-described processes.

When the adding selection is finished (Yes) at Step S102, or when No is determined at Step S80, or when the process at Step S84 is completed, the main control unit 22 carries out address book registration at Step S104. More specifically, the main control unit 22 registers the character information of the respective items entered to the address book 46. Thereafter, the main control unit 22 ends the process.

In this manner, the mobile electronic apparatus 1 combines and stores the character information entered by a write-now process and the information acquired in a business card analysis (character analysis) in the same item, thereby making it possible to use the information read out in the business card analysis more effectively. Furthermore, with a simple operation, more information can be registered in the address book 46.

The method of registering the character information read out and the character information entered by a write-now process to the address book 46 is not limited to the process illustrated in FIG. 5. For example, it may be configured that, out of the character information read out, items not corresponding to the address book 46 are deleted. With much more user operation, it may be configured that mapping the respective items read out to the items of the address book 46 is carried out by the user operation.

Figure 6:
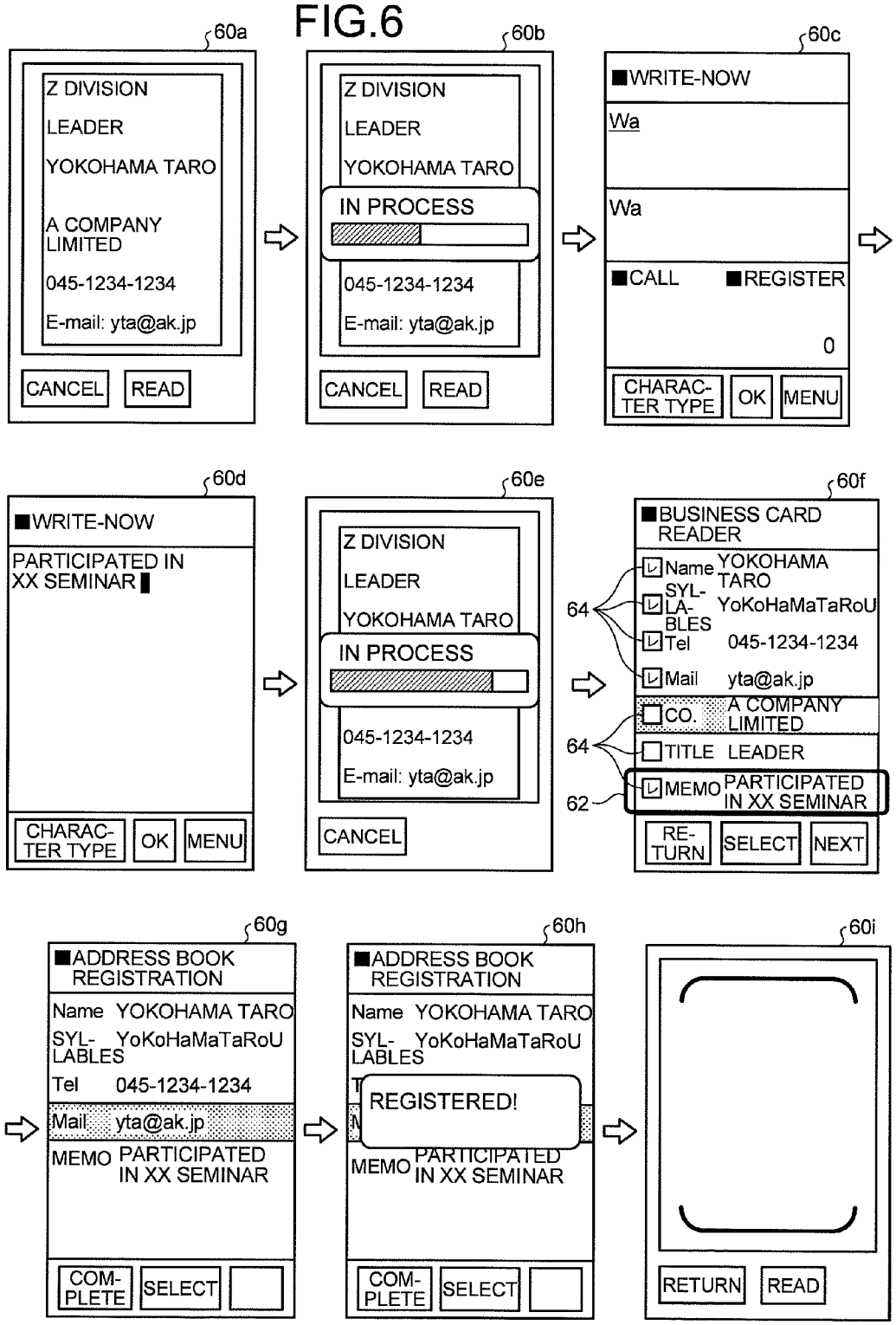
FIG. 6 is a diagram for explaining an operation performed by the mobile electronic apparatus.

With specific examples of screen transitions illustrated in FIGS. 6 to 11, operations performed by the mobile electronic apparatus 1, i.e., the processing operations illustrated in FIGS. 3 to 5 will be described. First, with reference to FIG. 6, the relationship of screen changes and the processes performed from reading a business card to completing registering to the address book 46 will be explained. FIG. 6 is a diagram for explaining an operation performed by the mobile electronic apparatus.

When a business card reading operation is started, as exemplified by a screen 60a in FIG. 6, the main control unit 22 displays an image photographed by the camera 36. In the screen 60a, a business card is being photographed under the condition of the business card being placed in the photographing area. When a reading operation is entered in a state of the screen 60a, the main control unit 22 carries out reading an image, i.e., photographing an image, and further carries out the analysis of the image of the business card read out. While the analysis is in process, the main control unit 22 displays a bar indicating the progress of analyzing process as exemplified by a screen 60b.

When the operation keys 3 are pressed down while the business card analysis is in process as exemplified by the screen 60b, the main control unit 22 starts a write-now process and displays, as exemplified by a screen 60c, character information corresponding to the operation keys 3 pressed down. The screen 60c exemplifies a state where a key assigned with a numeral "0" and a kana character of "Wa" as one of the operation keys 3 is pressed down once. In a state where a character input mode is not selected, the main control unit 22 displays, as exemplified by the screen 60c, both character(s) and numeral(s) corresponding to the operation.

When a kana character input mode is then selected as input mode and the operation keys 3 are pressed down, the main control unit 22 makes the display unit 32 display, as exemplified by a screen 60d, characters in response to the presses. The screen 60d indicates an example of "Participated in xx seminar" being entered as character information.

When a deciding operation of input characters is detected, the main control unit 22 then ends the write-now input process and displays, as exemplified by a screen 60e, a bar indicating the progress of analyzing process. When the analyzing process is completed, the main control unit 22 then displays, as exemplified by a screen 60f, character information of the analyzed business card by item. The main control unit 22 further displays kana character information entered in the write-now process at a memo item 62. The main control unit 22 displays a check box 64 at the beginning of each of the items and displays check marks on the items to be reflected on the address book 46 out of the items read out from the business card information and the items entered in the write-now process. The items to be reflected are selectable by the operation of the user.

When a select ending operation is entered by the user, i.e., when a key corresponding to "next" is pressed down in the present embodiment, the main control unit 22 displays a screen 60g as a screen to confirm items to be registered in the address book 46. In the screen 60g, the items selected in the screen 60f are displayed as the information to be registered in the address book 46. When a deciding operation is entered by the user, i.e., when a key corresponding to "complete" is pressed down in the present embodiment, the main control unit 22 then carries out the process of registering the respective items in the address book 46 and displays, as exemplified by a screen 60h, a message (character information) indicating that the registration is completed. When the registering process is completed, the main control unit 22 then starts a reading operation again by the camera 36 and makes the display unit 32 display, as exemplified by a screen 60i, an image acquired by the camera 36. The mobile electronic apparatus 1 and the main control unit 22 carry out in this way a business card reading process, an analyzing process, a character input process, and an address book registering process.

The mobile electronic apparatus 1 displays a screen in this way and thus indicates a processing state to the user in an easy-to-understand manner. Furthermore, as exemplified by the screen 60c, an area of the screen is divided into two display areas and input characters entered in the kana character input mode are displayed on one of the display areas and input characters entered in the numeric character input mode are displayed on the other one of the display areas, thereby making it easier for the user to select an input mode.

Figure 7:
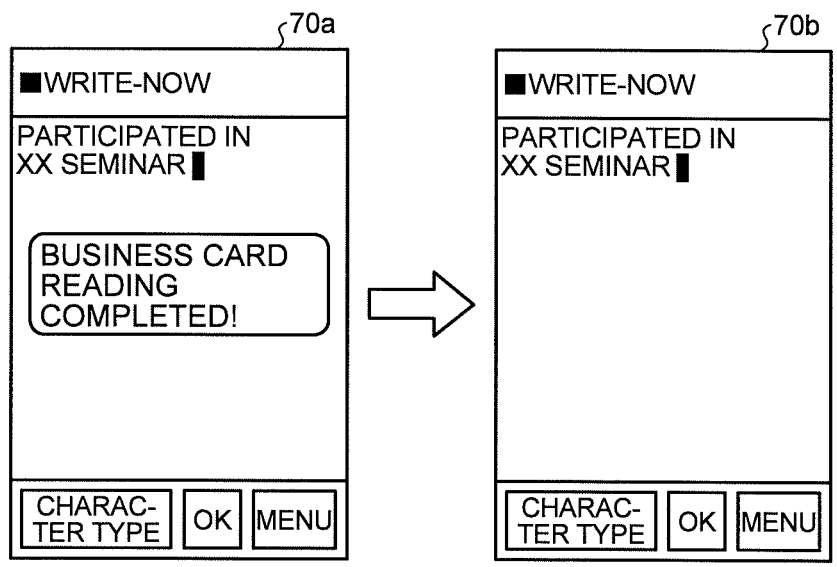
FIG. 7 is a diagram for explaining an operation performed by the mobile electronic apparatus.
Figure 8:
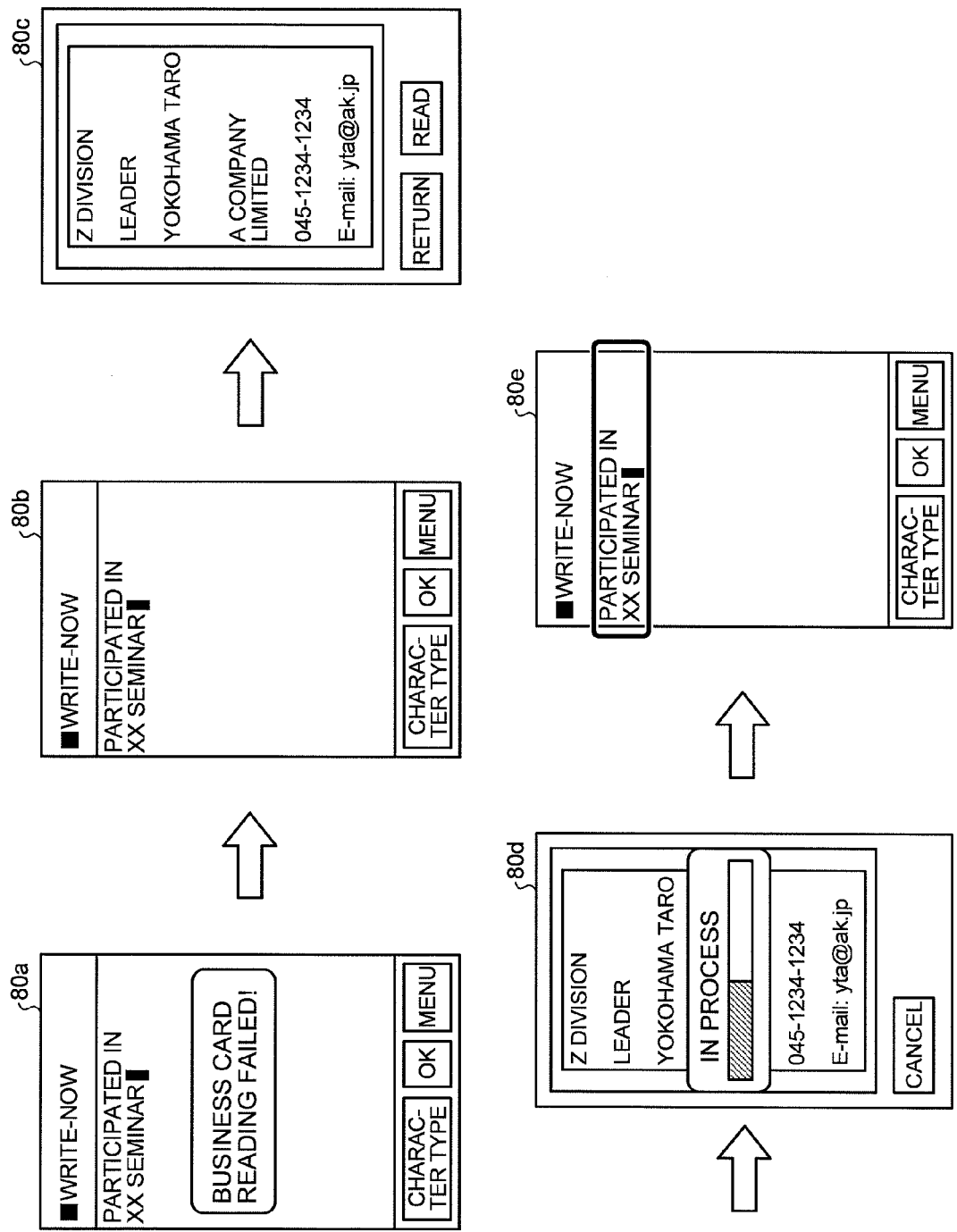
FIG. 8 is a diagram for explaining an operation performed by the mobile electronic apparatus.

With reference to FIGS. 7 and 8, a processing operation performed when an analyzing process is completed during a write-now process will be explained. FIGS. 7 and 8 are diagrams for explaining operations performed by the mobile electronic apparatus. FIG. 7 is a diagram illustrating a processing operation performed when an analyzing process is succeeded, more specifically, the operations performed from Step S42 to Step S46. FIG. 8 is a diagram illustrating a processing operation performed when an analyzing process is failed and a reading process is carried out again, more specifically, the operations performed from Step S42 to Step S48, and the processing operations performed from Step S26 to Step S32 and from Step S14 to Step S18. The processing operations illustrated in FIGS. 7 and 8 except for a part of the processes are the same as those illustrated in FIG. 6, and thus only the difference in processing operations will be explained in the followings.

When an analyzing process of a business card is successfully completed while characters are being entered as illustrated in the above-described screen 60d in FIG. 6 and before a deciding process of the characters is entered, the main control unit 22 displays, as exemplified by a screen 70a in FIG. 7, a message indicating that the analysis is completed ("Business card reading completed!" in the present embodiment) as a pop-up. When an instruction to end the pop-up display is detected, the main control unit 22 ends the pop-up display and returns, as exemplified by a screen 70b, to a character input screen. When a deciding operation of input characters is entered, the main control unit 22 then displays the screen 60f and subsequently carries out the same processes as those illustrated in FIG. 6.

In contrast, when the analyzing process of a business card is failed while characters are being entered as exemplified by the above-described screen 60d in FIG. 6 and before a deciding process of the characters is entered, the main control unit 22 displays, as exemplified by a screen 80a in FIG. 8, a message indicating that the analysis is failed ("Business card reading failed!" in the present embodiment) as a pop-up. When an instruction to end the pop-up display is detected, the main control unit 22 ends the pop-up display and returns, as exemplified by a screen 80b, to a character input screen.

When an instruction to read an image of the business card again is entered by the user, the main control unit 22 then stores the entered character information as write-now content and displays, as exemplified by a screen 80c in FIG. 8, an image being photographed by the camera 36. The screen 80c exemplifies, similarly to the screen 60a, a condition of the business card being placed in the photographing area. When a reading operation is entered under the state of the screen 80c, the main control unit 22 carries out reading the image, i.e., photographing the image and further carries out an analysis of the image of the business card read out. The main control unit 22 displays, as exemplified by a screen 80d, a bar indicating the progress of the analyzing process.

When the operation keys 3 are pressed down while the analysis of the business card is being processed as exemplified by the screen 80d, the main control unit 22 starts a write-now process. At this time, the main control unit 22 reads out the character information stored as the write-now content and sets it as an initial value. Accordingly, the main control unit 22 displays, as exemplified by a screen 80e, a screen with "Participated in xx seminar" entered as input characters.

As described above, when an analysis of character information of a business card is failed, the mobile electronic apparatus 1 stores the content entered in a write-now process, and then reads out the stored content in a write-now process while a following (subsequent) analysis of character information is being processed and sets it as the characters entered. Consequently, the user is not required to enter the characters again, and thus this allows the user to save the trouble of operation.

Furthermore, the mobile electronic apparatus 1 does not change screens until input characters are decided even when the analysis of information is finished while characters are being entered, in other words, allows the input characters to be decided, and thus makes it possible to reduce the input characters from being interrupted halfway through. In other words, the input characters intended by the user can be entered.

Figure 9:
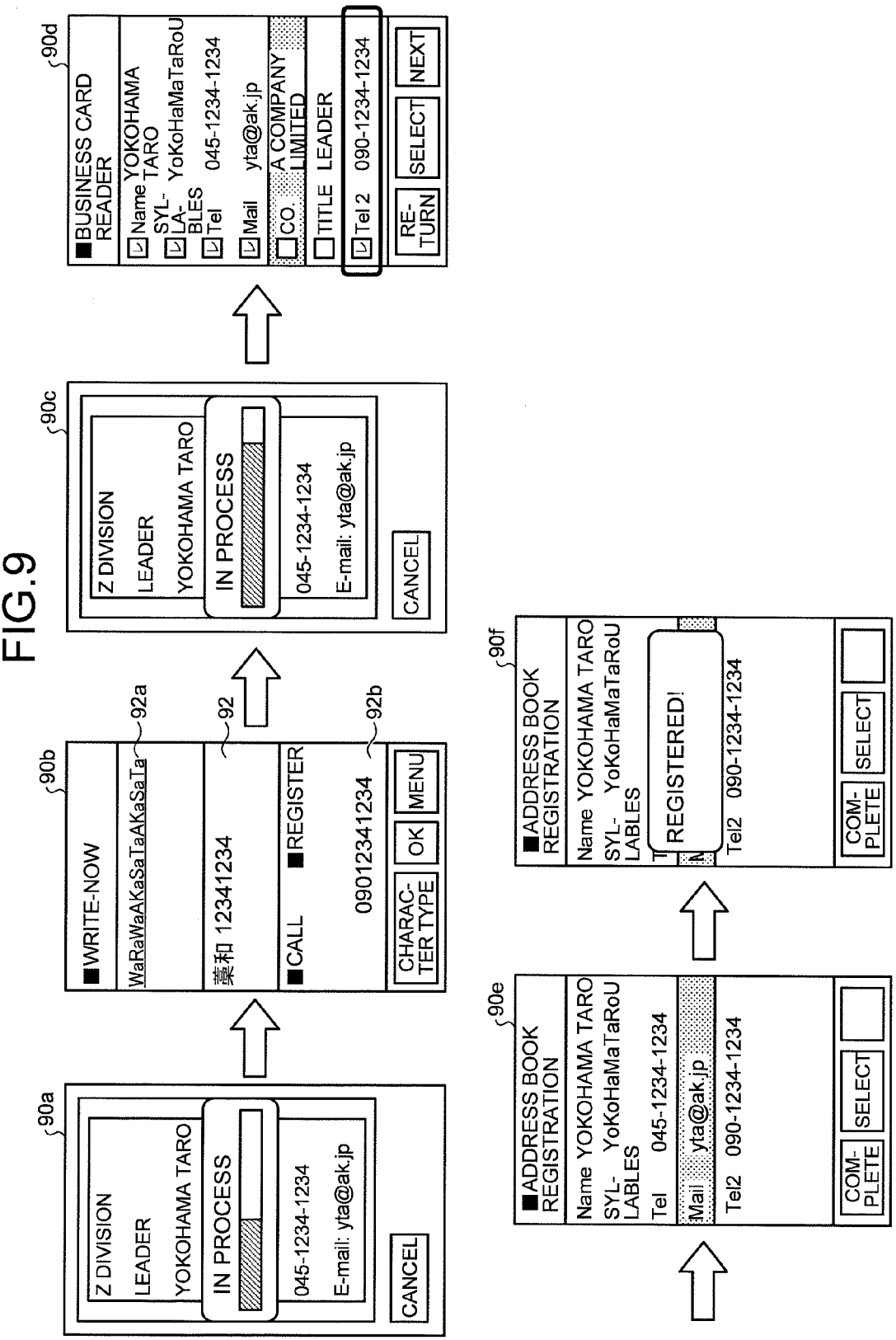
FIG. 9 is a diagram for explaining an operation performed by the mobile electronic apparatus.

With reference to FIG. 9, a processing operation performed when entering a telephone number by a write-now process will be explained. FIG. 9 is a diagram for explaining an operation performed by the mobile electronic apparatus. The processing operations illustrated in FIG. 9 except for a part of the processes are the same as those illustrated in FIG. 6, and thus only the difference in processing operations will be explained in the followings.

When the operation keys 3 are pressed down while an analysis of a business card is being processed as exemplified by a screen 90a, the main control unit 22 first starts a write-now process. When the operation keys 3 are pressed down in the write-now process in the order of 0-9-0-1-2-3-4-1-2-3-4, the main control unit 22 makes, as exemplified by a screen 90b, a display area 92a display "WaRaWaAKaSaTaAKaSaTa" corresponding to the kana character input mode and makes a display area 92b display "09012341234" corresponding to the numeric character input mode. The main control unit 22 further makes a display area 92 display "WaRaWa (in Chinese (kanji) characters) 12341234" as a candidate of character conversion for "WaRaWaAKaSaTaAKaSaTa".

When a deciding operation of input characters is detected, the main control unit 22 then ends the write-now input process and displays, as exemplified by a screen 90c, an image indicating the progress of the analyzing process. Because it is not decided as kana character input and a numerical value is greater than eight digits, the main control unit 22 further sets up the input characters entered in the write-now process as a telephone number.

When the analyzing process is finished, the main control unit 22 then displays, as exemplified by a screen 90*d*, the character information of the analyzed business card by item as an address book registering screen. The input characters entered in the write-now process are displayed in association with a telephone number item. Moreover, because there is a telephone number detected in the business card analysis, the input characters entered in the write-now process are displayed as a second telephone number (Tel 2) item.

When a select ending operation is entered by the user, i.e., when a key corresponding to "next" is pressed down in the present embodiment, the main control unit 22 displays a screen 90*e* as a screen to confirm items to be registered in the address book 46. In the screen 90*e*, the items selected in the screen 90*d* are displayed as the information to be registered in the address book 46. When a deciding operation is entered, i.e., when a key corresponding to "complete" is pressed down in the present embodiment, the main control unit 22 then carries out the process of registering the respective items in the address book 46 and displays, as exemplified by a screen 90*f*, a message (character information) indicating that the registration is completed.

In this manner, the mobile electronic apparatus 1 classifies the items of input characters by the number of digits of a numerical value, and thus allows the user to enter the information of various items corresponding to numerical values without selecting the items.

Figure 10:
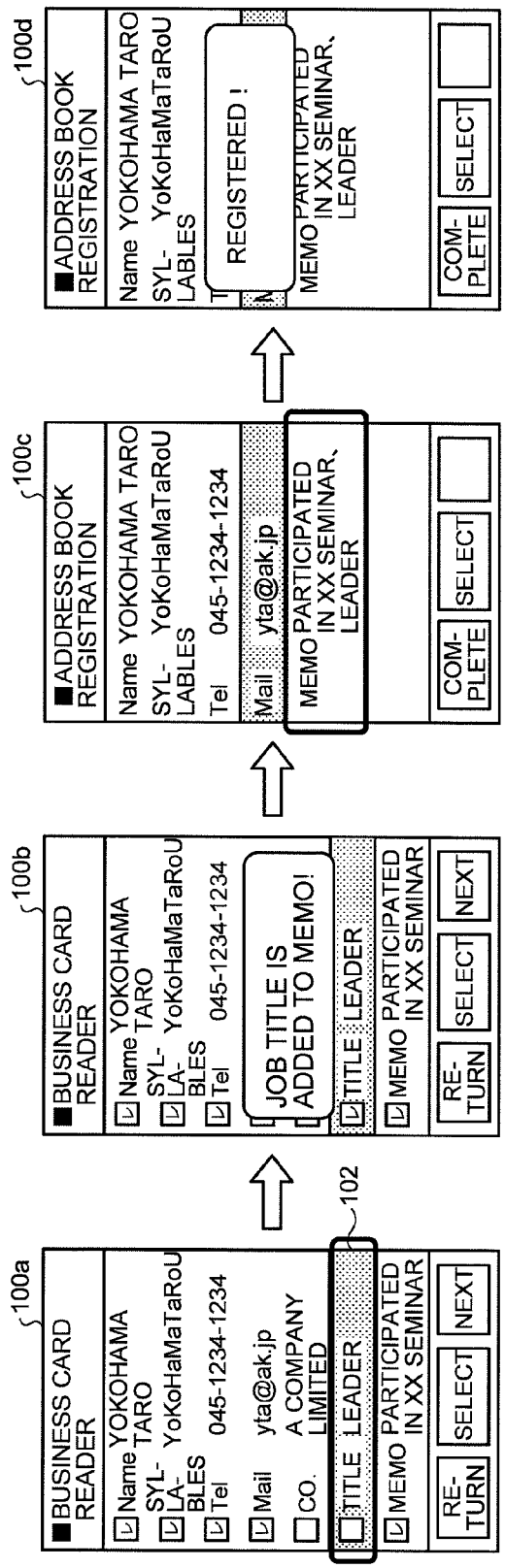
FIG. 10 is a diagram for explaining an operation performed by the mobile electronic apparatus.

With reference to FIG. 10, a processing operation to add information detected in an analyzing process of a business card to a memo item of the address book 46, in other words, the processing operation illustrated in FIG. 5 will be explained. FIG. 10 is a diagram for explaining an operation performed by the mobile electronic apparatus.

The main control unit 22 carries out the same processes as the above-described processing operations illustrated in FIG. 6 for a business card reading process, an analyzing process, and a write-now input process. When an analyzing process is completed, the main control unit 22 displays, as exemplified by a screen 100*a*, character information of the analyzed business card by item as an address book registering screen. In the screen 100*a*, an item selecting operation is carried out and a job title item is selected by a cursor 102.

When a decision key for adding an item (a key corresponding to a select key in the present embodiment) is pressed down under a condition that a job title item is selected by the cursor 102, the main control unit 22 determines that a job title item is selected as an adding item. The main control unit 22 then displays, as exemplified by a screen 100*b*, a message indicating that a job title item is selected ("Job title is added to memo!" in the present embodiment) as a pop-up. Furthermore, a check mark is displayed in the check box corresponding to the job title item.

When a select ending operation is entered by the user, i.e., when a key corresponding to "next" is pressed down in the present embodiment, the main control unit 22 displays a screen 100*c* as a screen to confirm items to be registered in the address book 46. In the screen 100*c*, the items selected in the screen 100*b* are displayed as the information to be registered in the address book 46. Accordingly, in a memo field, the character information of the job title item is added to the character information entered by the write-now process, and thus "Participated in xx seminar, Leader" is displayed. When a deciding operation is entered by the user, i.e., when a key corresponding to "complete" is pressed down in the present embodiment, the main control unit 22 then carries out the process of registering the respective items to the address book 46 and displays, as exemplified by a screen 100*d*, a message (character information) indicating that the registration is completed.

Figure 11:
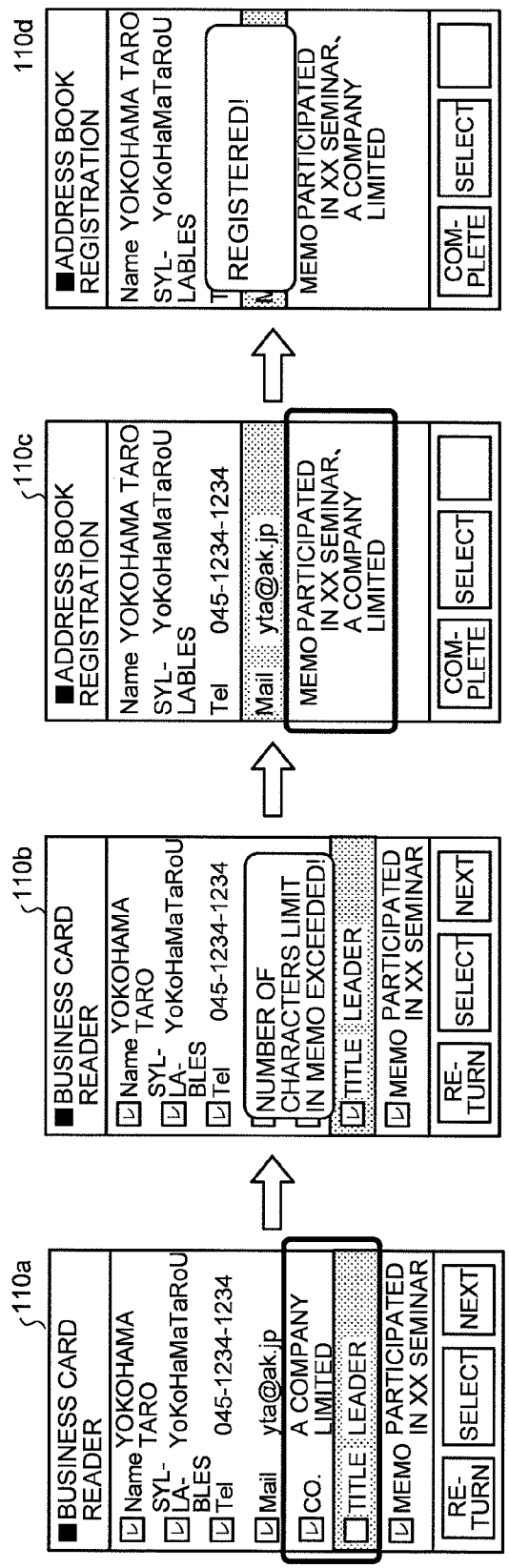
FIG. 11 is a diagram for explaining an operation performed by the mobile electronic apparatus.

With reference to FIG. 11, the processing operation performed when information detected in an analyzing process of a business card is added to a memo item of the address book 46 and the number of characters exceeds a limit will be explained. FIG. 11 is a diagram for explaining an operation performed by the mobile electronic apparatus.

The main control unit 22 carries out the same processes as the above-described processing operations illustrated in FIG. 6 for a business card reading process, an analyzing process, and a write-now input process. When an analyzing process is completed, the main control unit 22 displays character information of the analyzed business card by item as an address book registering screen. Under this condition, when company name is selected as an adding item, the main control unit 22 displays, as exemplified by a screen 110*a*, a check mark in the check box corresponding to the company name item.

When the decision key for adding an item is pressed down in a state of a job title item being selected, the main control unit 22 determines that the job title item is also selected as an adding item. The main control unit 22 then determines the number of characters of character information to be entered to a memo item, and when the number of characters exceeds a limit value, the main control unit 22 displays, as exemplified by a screen 110*b*, a message indicating a warning ("Number of characters limit in memo exceeded!" in the present embodiment) as a pop-up. The main control unit 22 further displays a check mark in the check box corresponding to the job title item.

When a select ending operation is entered by the user, i.e., when a key corresponding "next" is pressed down in the present embodiment, the main control unit 22 then displays a screen 110*c* as a screen to confirm items to be registered in the address book 46. In the screen 110*c*, items selected on the screen 110*a* are displayed as the information to be registered in the address book 46. Accordingly, in a memo field, the character information of the company name item is added to the character information entered in the write-now process, and thus "Participated in xx seminar, A Company Limited" is displayed. However, the character information of the job title is not added. When a deciding operation is entered by the user, i.e., when a key corresponding to "complete" is pressed down in the present embodiment, the main control unit 22 then carries out the process of registering the respective items to the address book 46 and displays, as exemplified by a screen 110*d*, a message (character information) indicating that the registration is completed.

The mobile electronic apparatus 1 changes screens and displays massages in pop-up as illustrated in FIGS. 6 to 11, and thus indicates statuses to the user in an easy-to-understand manner.

Figure 12:
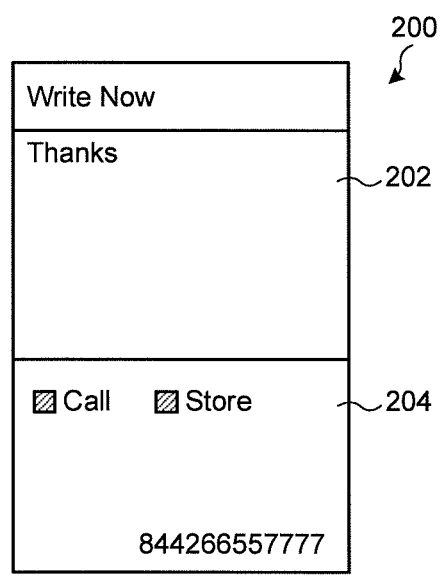
FIG. 12 is a diagram for explaining an operation performed by the mobile electronic apparatus.

In the above-described embodiment, it has been exemplified that numeric characters and kana characters are entered as the characters to be entered by the operation of the operation keys 3, however, it is not limited as such. The input characters can be used to enter numeric characters and various types of characters of kana characters. When two kinds of character information are detected using the write-now program, numeric characters and non-numeric characters can be detected. FIG. 12 is a diagram for explaining an operation performed by the mobile electronic apparatus. The screen illustrated in FIG. 12 is an example performed when numeric characters and alphabets are entered as the characters to be entered by the operation of the operation keys 3. In an alphabet input mode, similarly to the kana character input mode, a single key of the operation keys 3 assigned with a numeral is assigned with a plurality of alphabets. For example, a key assigned with a numeral "4" is assigned with "G", "H", and "I", and it is determined that "G" is entered when the "4" key is pressed down once, "H" is entered when the "4" key is pressed down twice successively, and "I" is entered when the "4" key is pressed down three times successively.

When the operation keys 3 are pressed down while an analysis of a business card is in process, the main control unit 22 starts a write-now process. When the operation keys 3 are pressed down in the write-now process in the order of 8-4-4-2-6-6-5-5-7-7-7-7, the main control unit 22 displays, as exemplified by a screen 200, "Thanks" corresponding to the alphabet input mode in a display area 202 and displays "844266557777" corresponding to the numerical character input mode in a display area 204. In this way, the main control unit 22 can also enter alphabets as input characters other than numeric characters using the write-now program. In the embodiment above, while kana characters and alphabets are used as the non-numeric characters, the present invention is not limited to this. As for the non-numeric characters, various types of characters used in various languages such as Latin and Chinese can be used.

In the embodiment above, while a business card is used as a subject from which character information is read out, the present invention is not limited to this. Various types of objects described with character information can be a subject of photographing, and the invention can be used, for example, when a string of characters described with a URL or a string of characters printed on paper (sentences) is defined as a subject of reading, i.e., as a subject of photographing. Furthermore, in the above embodiment, although an image is read by the camera, the present invention is not limited as such and, as an acquiring unit, various photographing elements and various photographing methods can be used.

INDUSTRIAL APPLICABILITY

As described in the foregoing, the mobile electronic apparatus and the control method of the mobile electronic apparatus according to the invention are useful to be used in an apparatus that reads character information from an image.

The invention claimed is:

1. A mobile electronic apparatus, comprising:
a storage unit;
an operating unit for performing a character input operation for inputting characters;
a built-in acquiring unit for acquiring a photographed image of a subject;
a display unit disposed on at least a first surface of the mobile electronic apparatus;
an analyzing unit for extracting character information contained in the photographed image; and
a control unit configured to
cause the display unit to display a first screen indicating a progress of extracting the character information from the photographed image,
in response to the character input operation which (i) is performed with the operating unit at any time during the progress of extracting the character information from the photographed image and (ii) does not specify any character extracted from the photographed image,
cause the display unit to display a second screen different from the first screen, and display characters entered by the character input operation in the second screen, and
upon detecting an operation indicating an end of the character input operation while the second screen is displayed on the display unit,
store, in the storage unit, the characters entered by the character input operation in association with the character information extracted by the analyzing unit,
wherein the built-in acquiring unit is disposed at least on the first surface or on a second surface of the mobile electronic apparatus to the display unit, the second surface being opposite to the first surface.

2. The mobile electronic apparatus according to claim 1, wherein
the characters include numeric characters and non-numeric characters,
the operating unit includes at least ten keys for inputting the characters,
each of the at least ten keys is assigned with one of the numeric characters and at least one of the non-numeric characters,
the storage unit is configured to store therein the character information extracted by the analyzing unit in such a manner that the character information is separated into a plurality of items, and
the control unit is configured to map, according to the characters entered by the character input operation, the entered characters to the plurality of items.

3. The mobile electronic apparatus according to claim 2, wherein the control unit is configured to map, according to a number of digits of the numeric characters entered by the character input operation, the entered characters to the corresponding items.

4. The mobile electronic apparatus according to claim 1, wherein the control unit is configured to store therein characters entered by the character input operation when an analyzing process by the analyzing unit is determined failed, and to determine the stored characters as the characters entered by the character input operation during a subsequent analyzing process.

5. The mobile electronic apparatus according to claim 1, wherein
the characters include numeric characters and non-numeric characters,
the operating unit includes a plurality of keys each assigned with the numeric characters and the non-numeric characters, and
the control unit is configured to cause the display unit to display both the numeric characters and the non-numeric characters as input characters corresponding to the character input operation.

6. The mobile electronic apparatus according to claim 5, wherein the control unit is configured to divide a display area of the display unit into two display areas including a first display area and a second display area and to cause the display unit to display characters entered as the non-numeric characters on the first display area and display characters entered as the numeric characters on the second display area upon detecting the character input operation.

7. The mobile electronic apparatus according to claim 5, wherein the non-numeric characters include alphabets.

8. The mobile electronic apparatus according to claim 1, wherein the control unit is configured to inform a completion of an analyzing process performed by the analyzing unit when the analyzing process is completed while characters are being entered.

9. The mobile electronic apparatus according to claim 1, wherein the subject is a business card.

10. A method of controlling a mobile electronic apparatus including a storage unit, an operating unit for performing a character input operation, a built-in acquiring unit for acquiring an image, a display unit, an analyzing unit for analyzing an image and extracting character information contained in the image, and a control unit, the method comprising:
  acquiring, by the built-in acquiring unit, a photographed image of a subject;
  analyzing, by the analyzing unit, the photographed image and extracting character information contained in the photographed image;
  displaying, by the display unit, a first screen indicating a progress of extracting the character information from the photographed image;
  in response to the character input operation which (i) is performed with the operating unit at any time during the progress of extracting the character information from the photographed image and (ii) does not specify any character extracted from the photographed image, displaying, by the display unit, a second screen different from the first screen, and displaying characters entered by the character input operation in the second screen; and
  upon detecting an operation indicating an end of the character input operation while the second screen is displayed on the display unit,
    storing, in the storage unit, the characters entered by the character input operation in association with the character information extracted by the analyzing unit,
wherein
  the display unit is disposed on at least a first surface of the mobile electronic apparatus, and
  the built-in acquiring unit is disposed at least on the first surface or on a second surface of the mobile electronic apparatus to the display unit, the second surface being opposite to the first surface.

11. A mobile electronic apparatus comprising:
  a storage unit;
  an operating unit for performing a character input operation;
  a built-in acquiring unit for acquiring a photographed image of a subject;
  a display unit disposed on a surface of the mobile electric apparatus;
  an analyzing unit for analyzing the photographed image acquired by the built-in acquiring unit and extracting character information contained in the photographed image; and
  a control unit configured to,
    upon the photographed image being analyzed, cause the display unit to display a first screen for indicating a progress of the analyzing by the analyzing unit,
    upon detecting the character input operation which (i) is performed with the operating unit at any time during the progress of analyzing the photographed image and (ii) does not specify any character extracted from the photographed image,
      cause the display unit to switch the first screen for indicating the progress of the analyzing to a second screen, different from the first screen, for displaying characters entered by the character input operation, and
    upon detecting an operation indicating an end of the character input operation while the second screen is displayed on the display unit,
      store, in the storage unit, the characters entered by the character input operation in addition to and without replacing the character information extracted by the analyzing unit.

12. The mobile electronic apparatus according to claim 1, wherein
  the control unit is configured to, upon detecting the character input operation on the operating unit anytime during the progress of extracting the character information contained in the photographed image, activate a program of entering characters by the character input operation.

13. The mobile electronic apparatus according to claim 1, wherein
  the control unit is configured to detect pressing a key of the operation unit as the character input operation.

14. The mobile electronic apparatus according to claim 1, wherein
  the control unit is configured to, anytime during the progress of extracting the character information contained in the photographed image,
    activate a program for entering characters by the character input operation, and
    cause the display unit to display the characters that are entered by the character input operation to activate the program.

15. The mobile electronic apparatus according to claim 11, wherein
  the control unit is configured to, upon detecting the character input operation on the operating unit anytime during the progress of extracting the character information contained in the photographed image, activate a program for entering characters by the character input operation.

16. The mobile electronic apparatus according to claim 11, wherein
  the control unit is configured to detect pressing a key of the operation unit as the character input operation.

17. The mobile electronic apparatus according to claim 11, wherein
  the control unit is configured to, anytime during the progress of extracting the character information contained in the photographed image,
    activate a program for entering characters by the character input operation, and
    cause the display unit to display the characters that are entered by the character input operation to activate the program.

* * * * *